Figure 1:
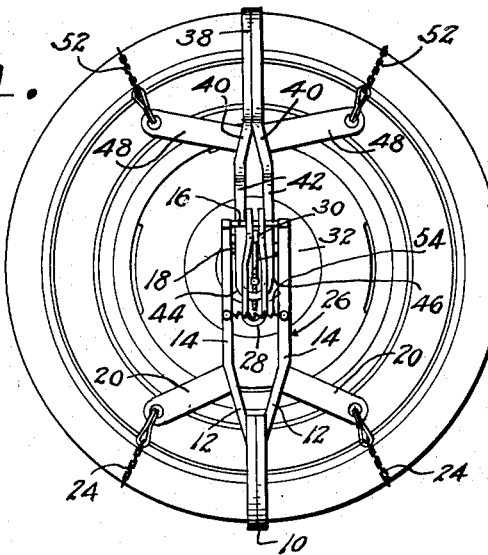

May 12, 1953 W. P. PAULSEN 2,638,140
TRACTION DEVICE
Filed Jan. 14, 1952 2 Sheets-Sheet 1

William P. Paulsen INVENTOR

BY *CA Snow &Co.*
ATTORNEYS.

May 12, 1953 W. P. PAULSEN 2,638,140
TRACTION DEVICE
Filed Jan. 14, 1952 2 Sheets-Sheet 2
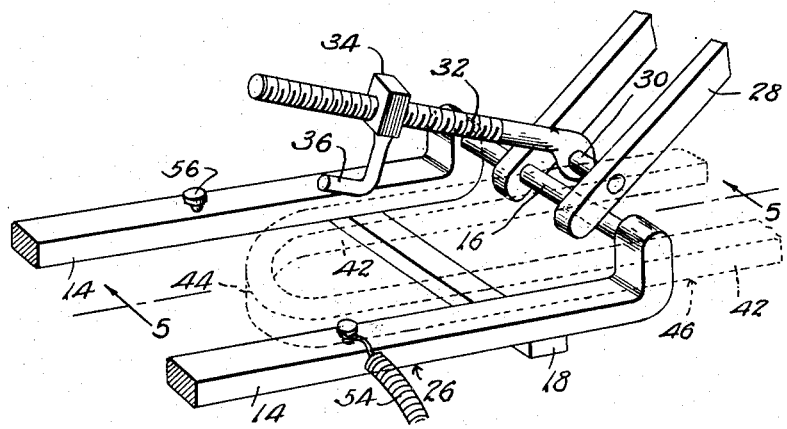
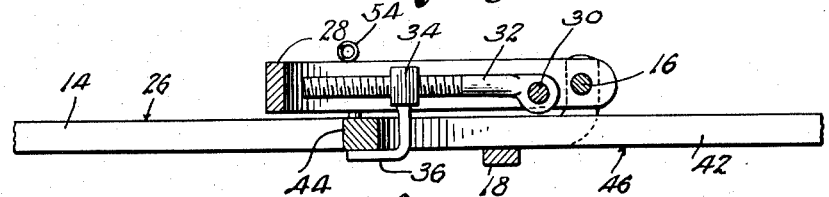
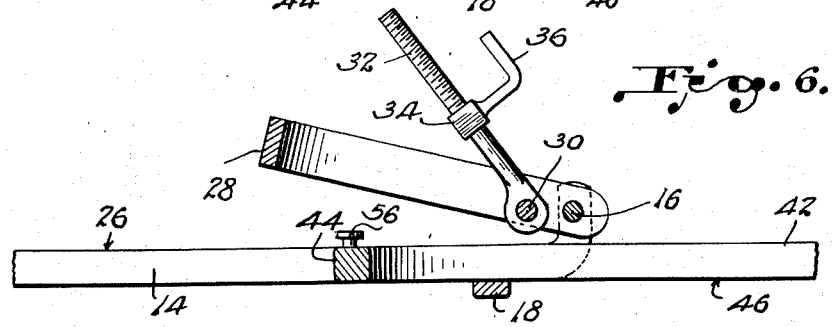
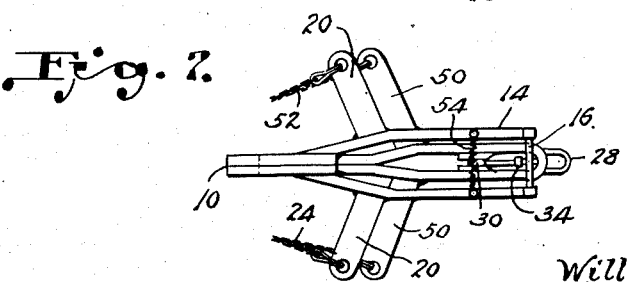
William P. Paulsen
INVENTOR
BY *C. A. Snow & Co.*
ATTORNEYS Patented May 12, 1953

2,638,140

UNITED STATES PATENT OFFICE 2,638,140

TRACTION DEVICE

William P. Paulsen, Canton, S. Dak.

Application January 14, 1952, Serial No. 266,285

4 Claims. (Cl. 152—223)

This invention relates to a traction device for attachment to a traction wheel of a vehicle and has for its primary object to provide traction in mud or snow or when the vehicle is travelling over icy surfaces.

The primary object of the invention is to increase the traction of a power driven wheel, when the surface traversed is in a slippery condition so as to avoid the loss of power through the spinning of the wheel and to prevent skidding.

Another object is to facilitate the rapid mounting and demounting of a traction device on a traction wheel and at the same time assure its secure attachment to the wheel when in use.

A further object is to facilitate the storage of the traction device when it is not in use so that it may be conveniently carried in a motor vehicle and will occupy but a minimum amount of space therein.

The above and other objects may be attained by employing this invention which embodies among its features aligned longitudinally extensible hooks adapted to engage the tread of a vehicle tire in diametrically opposed zones, arms carried by the hooks and extending laterally therefrom on opposite sides of the vehicle tire and flexible members connected to the arms and adapted to extend across the tread of the tire on opposite sides of the hooks, and means for connecting said hooks together and contracting them into embracing relation to the vehicle tire.

Other features include telescopic yokes connected to the hooks, a hook member carried by one of said yokes for removably engaging the other yoke, and means carried by the first mentioned yoke and connected to the hook member for advancing and retracting said hook member longitudinally of the yokes and into and out of engagement with the second mentioned yoke.

Other features include yielding means connected to the hook member and to one of the yokes for releasably holding the hook member in engagement with the cooperating yoke when the device is in place on a tire, and for completely disengaging the cooperating yoke to permit the separation of the parts for nesting and storage.

Figure 3:
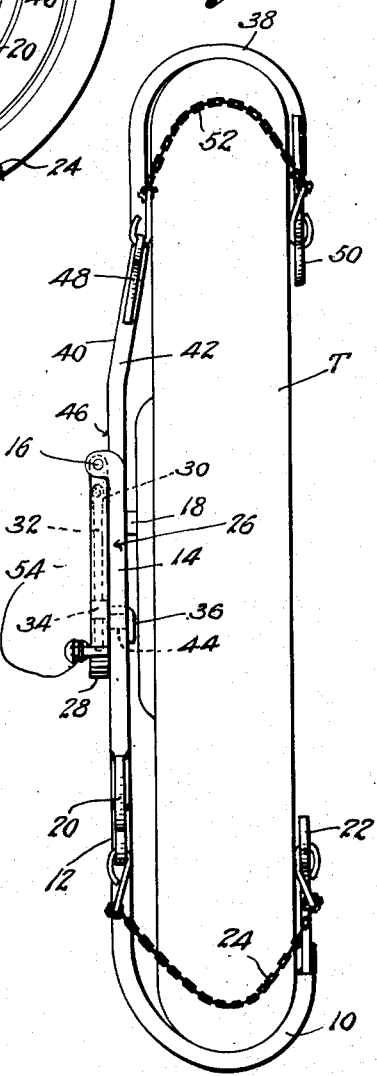
Figure 2:
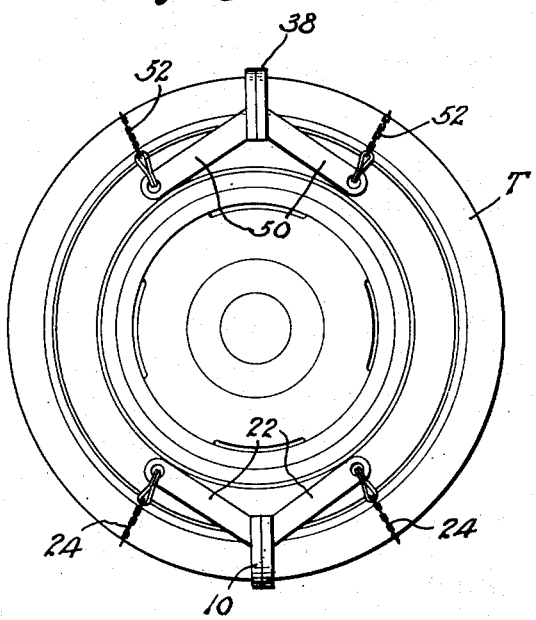

In the drawings,

Fig. 1 is a side view of a vehicle wheel showing this improved traction device in place thereon, Fig. 2 is a view of the opposite side of the wheel shown in Fig. 1 illustrating the traction device in place, Fig. 3 is an enlarged edge view of the wheel illustrated in Fig. 1 showing the position of the hooks and flexible members when the device is mounted on a wheel, Fig. 4 is an enlarged fragmentary perspective view illustrating the cooperating longitudinally telescopic yokes and the locking means therefor, Fig. 5 is a longitudinal sectional view taken substantially along the line 5—5 of Fig. 4 and showing the hook member in engagement with the cooperating yoke, and Fig. 6 is a view similar to Fig. 5 and illustrating the release lever in an unlocked position with the hook member withdrawn from engagement with the bight portion of the cooperating yoke.

Fig. 7 is a view of the parts nested for transportation or storage.

Referring to the drawings in detail, a tire tread engaging hook 10 is provided adjacent one end with a pair of divergent legs 12 which terminate at their ends remote from the hook 10 in longitudinally extending spaced parallel arms 14 which carry on one side adjacent their ends remote from the hook 10 a transversely extending pivot bar 16. A transversely extending stop bar 18 is carried by the arms 14 on the side thereof remote from the pivot bar 16 and between the said pivot bar 16 and the hook 10 as will be readily understood upon reference to the drawings.

Carried by the hook 10 and extending laterally therefrom adjacent one side of a vehicle wheel are extensions 20 and extending laterally from the hook 10 on the opposite side of the vehicle wheel are laterally extending extensions 22. Flexible members such as chains 24 are connected to the extensions 20 and 22 remote from the hook 10 and extend across the tread of the tire T on opposite sides of the hook 10.

Pivotally mounted on the pivot bar 16 for swinging movement in an arcuate path which lies along the longitudinal axis of the yoke designated generally 26 formed by the spaced parallel arms 14 and the pivot bar 16 is a lever 28 to which is pivotally coupled as at 30 a threaded stud 32 upon which is threaded a nut 34 carrying a hook member 36 which extends toward the hook 10 for cooperative engagement with a second yoke to be more fully hereinafter described. A hook 38 of a construction similar to the hook 10 is provided at one end with divergent legs 40 which terminate in spaced parallel arms 42 carrying at their ends remote from the legs 40 a bight portion 44 which extends transversely between the legs 42 and is adapted to be entered into the yoke 26 between the legs 14 thereof. The legs 42 and the bight portion 44 form a second yoke designated generally 46 which is slidably received between the legs 14 of the yoke 26 and the pivot bar 16 and stop bar 18 previously described. Carried by and extending laterally from the hook 38 on the side of the wheel adjacent which the legs 42 extend are laterally extending extensions 48 which correspond to the extensions 20 of the hook 10. Extensions 50 are carried by the hook 38 on the side of the wheel opposite the extensions 48 and connected to the extensions 48 and 50 remote from the hook 38 are flexible members 52 preferably in the nature of chains which extend around the tread of the tire in substantial symmetry on opposite sides of the hook 38 when the device is in use.

When the device is disassembled and nested for storage as illustrated in Fig. 7, it is evident that a relatively small space will be occupied so that is may be easily stored in the trunk or other convenient portion of a motor driven vehicle. When, however, the device is to be employed to improve the traction of a vehicle wheel, the parts are assembled substantially as illustrated in Fig. 1 with the yoke 46 entered into the space between the arms 14 of the yoke 26 so that the bight portion 44 of the yoke 46 extends toward the hook 10 and the hooks 10 and 38 engage diametrically opposed zones of the tire T. With the parts thus assembled, the hook member 36 is disposed between the arms 42 of the yoke 46 in such a position that upon moving the lever 28 about the pivot bar 16 toward the hook 10, the stud 32 will advance the hook member 36 into engagement with the bight portion 44 of the yoke 46. Obviously by adjusting the nut 34 on the stud 32, the pressure with which the hooks 10 and 38 engage the tire T may be regulated. In moving the lever 28 to fully extend the hook member 36 into engagement with the bight portion of the yoke 46, the pivot 30 moves slightly beyond dead center so that the lever 28 cannot move about the pivot bar 16 except under the influence of positive effort.

A retractile coil spring 54 is attached at one end to an arm 14 of the yoke 26 near the pivot bar 16 and carried by the opposite arm 14 of the yoke near the pivot bar 16 is a stud 56 to which the opposite end of the spring 54 is releasably connected when the device is in use to form a retainer for holding the parts against accidental displacement. Obviously by releasing the spring and swinging the lever 28 in its arcuate path away from the hook 10 the hook member 36 may be disengaged from the bight portion 44 of the yoke 46 so that the parts may be disassembled from their position on the tire T when its traction improving qualities are no longer desired.

While in the foregoing there has been shown and described the preferred embodiment of this invention it is to be understood that minor changes in the details of construction combination and arrangement of parts may be resorted to without departing from the spirit and scope of the invention as claimed.

What is claimed is:

1. In a traction device aligned longitudinally extensible hooks adapted to engage the tread of a vehicle tire in diametrically opposed zones, arms carried by the hooks and extending laterally therefrom on opposite sides of the vehicle tire and flexible members connected to the arms and adapted to extend across the tread of the tire on opposite sides of the hooks, means for connecting said hooks together and contracting them into embracing relation to a vehicle tire comprising, telescopic yokes carried by the hooks, a hook member carried by one of said yokes for removably engaging the other yoke, and means carried by the first mentioned yoke and connected to the hook member for advancing and retracting said hook member longitudinally of the first mentioned yoke into and out of engagement with the second mentioned yoke.

2. In a traction device aligned longitudinally extensible hooks adapted to engage the tread of a vehicle tire in diametrically opposed zones, arms carried by the hooks and extending laterally therefrom on opposite sides of the vehicle tire and flexible members connected to the arms and adapted to extend across the tread of the tire on opposite sides of the hooks, means for connecting said hooks together and contracting them into embracing relation to a vehicle tire comprising, telescopic yokes carried by the hooks, an elongated lever pivoted adjacent one end to one of the yokes adjacent the end thereof remote from its hook, and a hook member pivotally connected to the lever intermediate the ends thereof for movement longitudinally of the yokes into and out of engagement with the opposite yoke.

3. In a traction device aligned longitudinally extensible hooks adapted to engage the tread of a vehicle tire in diametrically opposed zones, arms carried by the hooks and extending laterally therefrom on opposite sides of the vehicle tire and flexible members connected to the arms and adapted to extend across the tread of the tire on opposite sides of the hooks, means for connecting said hooks together and contracting them into embracing relation to a vehicle tire comprising, a pair of elongated spaced parallel arms carried by and extending longitudinally from one of the hooks, a pivot bar carried by and extending between the arms adjacent the ends thereof remote from the hook, a stop bar carried by the arms and extending transversely thereacross between the hook and the pivot bar, said arms and pivot bar forming a yoke, a substantially U-shaped yoke carried by the opposite hook and having spaced parallel arms and a bight portion extending transversely between said arms remote from the hook, said U-shaped yoke being adapted to enter the space between the arms of the first mentioned yoke and to move longitudinally in said space between the pivot bar and the stop bar, and means carried by the pivot bar and adapted to enter the space between the arms of said second mentioned yoke and engage the bight portion thereof for moving said yokes longitudinally and clamping the hooks against the tread of the vehicle tire.

4. In a traction device aligned longitudinally extensible hooks adapted to engage the tread of a vehicle tire in diametrically opposed zones, arms carried by the hooks and extending laterally therefrom on opposite sides of the vehicle tire and flexible members connected to the arms and adapted to extend across the tread of the tire on opposite sides of the hooks, means for connecting said hooks together and contracting them into embracing relation to a vehicle tire comprising, a pair of elongated spaced parallel arms carried by and extending longitudinally from one of the hooks, a pivot bar carried by and extending between the arms adjacent the ends thereof remote from the hook, a stop bar carried by the arms and extending transversely thereacross between the hook and the pivot bar, said arms and pivot bar forming a yoke, a substantially U-shaped yoke carried by the opposite hook and having spaced parallel arms and a bight portion extending transversely between said arms remote from the hook, said U-shaped yoke being adapted to enter the space between the arms of the first mentioned yoke and to move longitudinally in said space between the pivot bar and the stop bar, a lever mounted on the pivot bar to swing in an arcuate path which lies substantially along the longitudinal axes of the yokes, a hook member connected to the lever for movement therewith longitudinally between the arms of the yokes into and out of engagement with the bight portion, and a retractile coiled spring connected to an arm of the first mentioned yoke and adapted to extend across the lever for releasably holding said lever against accidental movement.

WILLIAM P. PAULSEN.

References Cited in the file of this patent

UNITED STATES PATENTS

| Number | Name | Date |
|---|---|---|
| 2,527,939 | Krider | Oct. 31, 1950 |
| 2,582,193 | Dowdell | Jan. 8, 1952 |
| 2,596,096 | Brandvold | May 13, 1952 |
| 2,598,298 | Pindjak | May 27, 1952 |